United States Patent [19]

Leighton et al.

[11] Patent Number: 4,946,627

[45] Date of Patent: Aug. 7, 1990

[54] HYDROPHOBICALLY MODIFIED POLYCARBOXYLATE POLYMERS UTILIZED AS DETERGENT BUILDERS

[75] Inventors: John C. Leighton, Flanders; Carmine P. Iovine, Bridgewater, both of N.J.

[73] Assignee: National Starch and Chemical Investment Holding Corporation, Wilmington, Del.

[21] Appl. No.: 381,894

[22] Filed: Jul. 19, 1989

[51] Int. Cl.$^5$ .................. C02F 5/12; C08F 220/58; C11D 3/37; C11D 17/08
[52] U.S. Cl. .................. 252/542; 252/173; 252/174.21; 252/174.24; 252/180; 252/356; 252/357; 252/524; 252/525; 252/527; 252/544; 252/546; 252/DIG. 2; 252/DIG. 11; 252/DIG. 14; 526/240; 526/271; 526/304; 526/312
[58] Field of Search ............. 252/173, 174.21, 174.24, 252/180, 356, 357, 524, 525, 527, 542, 544, 546, DIG. 2, DIG. 11, DIG. 14; 526/240, 271, 304, 312

[56] References Cited

U.S. PATENT DOCUMENTS

| | | | |
|---|---|---|---|
| 3,037,056 | 5/1962 | Lowe | 526/304 |
| 3,301,829 | 1/1967 | Woodward | 252/174.24 |
| 3,457,176 | 7/1969 | Huggins | 252/174.24 |
| 3,755,264 | 8/1973 | Testa | 526/240 |
| 3,870,648 | 3/1975 | Grifo | 252/135 |
| 3,898,034 | 8/1975 | Szymanski et al. | 8/137 |
| 4,421,902 | 12/1983 | Chang | 526/317 |
| 4,555,557 | 11/1985 | Fukumoto | 526/240 |
| 4,559,159 | 12/1985 | Denzinger et al. | 252/174.24 |
| 4,578,200 | 3/1986 | St. Laurent | 252/8.8 |
| 4,608,188 | 8/1986 | Parkers | 252/99 |
| 4,663,071 | 5/1987 | Bush et al. | 252/174.19 |
| 4,711,740 | 12/1987 | Carter et al. | 252/174.24 |
| 4,797,223 | 1/1989 | Amick et al. | 252/174.23 |

OTHER PUBLICATIONS

Lochhead, R. Y., et al.: "Hydrophobically Modified Carbopol Resins," *Soap/Cosmetics/Chemcial Specialties*, May, 1987, pp. 28-33 & 85.
"Sulfonamine MNPA Surface-Active Polyether Amines", Technical Bulletin published by Texaco Chemical Co., 1986, 6 pages.

*Primary Examiner*—Dennis Albrecht
*Attorney, Agent, or Firm*—Eugene Zagarella, Jr.; Edwin M. Szala

[57] ABSTRACT

This invention provides water soluble dispersible hydrophobically modified polycarboxylate polymers which are useful as detergent builders and detergent compositions utilizing these novel polymers as builders, the polymers comprise repeating units of the structure:

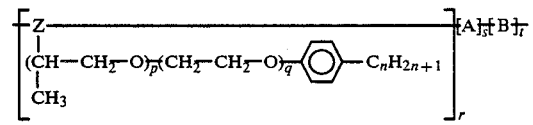

where Z is

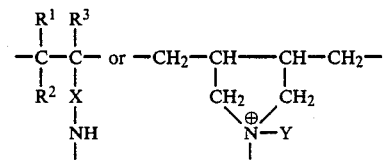

A is a repeating unit of structure:

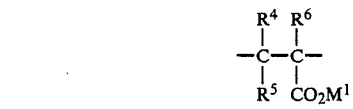

B is a repeating unit of structure:

$$-CH_2-\underset{\underset{R^8}{|}}{\overset{\overset{R^7}{|}}{C}}-$$

with typical repeating units r being derived from a monomer:

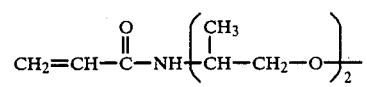

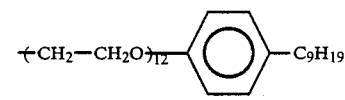

A derived e.g. from acrylic acid and B derived e.g. from styrene.

22 Claims, No Drawings

HYDROPHOBICALLY MODIFIED POLYCARBOXYLATE POLYMERS UTILIZED AS DETERGENT BUILDERS

BACKGROUND OF THE INVENTION

This invention relates to novel water soluble hydrophobically modified polycarboxylate polymers which are useful as builders in detergent compositions.

The use of builders to improve the overall detergency effectiveness and the whitening power of detergent formulations is well known to those skilled in the art. Typically, builders have been used among other things, as sequestering agents to remove metallic ions such as calcium or magnesium (or the "hardness") from the washing fluid, to provide solubilization of water insoluble materials, to promote soil suspension to retard soil redeposition and to provide alkalinity. The multiple roles played by the builder, as well as the ever changing demands of both household and industrial consumers tend to make formulating detergent compositions a difficult and sometimes complex process.

Polyphosphate compounds, such as tripolyphosphates and pyrophosphates are widely used as builders in detergent compositions, in part because of their ability in sequestering hardness ions. While the use of such phosphate compounds have been very effective, environmental concerns have mounted regarding their possible contribution to the growth of algae in lakes and streams and the resulting eutrophication of such bodies of water. This concern has caused significant legislative pressure to lower or discontinue the use of phosphates in detergent compositions to control pollution. Thus, detergent manufacturers continue to search for effective, non-phosphate detergent builders.

Various alternatives to phosphate builders have been tried and used by detergent formulators. Some of the non-phosphate builders which have been used include citrates, zeolites, silicates, carbonates and a number of organic builders. Among the materials that have been suggested for use in detergent builders are the carboxylated bicyclic compounds and salts thereof disclosed in U.S. Pat. No. 3,898,034 issued Aug. 5, 1975; water soluble co-polymers of unsaturated mono- and dicarboxylic acids with specific block alkylene oxide units disclosed in U.S. Pat. No. 4,559,159 issued Dec. 17, 1985; ether carboxylates shown in U.S. Pat. No. 4,663,071 issued May 5, 1987; copolymers of maleic anhydride and sulfonated styrene or 2-acrylamido-2-methyl propane sulfonic acid disclosed in U.S. Pat. No. 4,711,740 issued Dec. 8, 1987; and water soluble polymers of ethylenically unsaturated monocarboxylic acids and their salts which contain a pendant surfactant linked to the backbone through an ester or carbamate group disclosed in U.S. Pat. No. 4,797,223 issued Jan. 10, 1989.

Notwithstanding the existence of the foregoing types of detergent builders and the advances which have been made in reducing the amount of water-eutrophying phosphate builders in detergent compositions, there remains a continuing need to identify additional non-phosphorous sequestering agents, particularly those which are useful in liquid detergents. Accordingly, it is an object of this invention to provide detergent compositions employing effective, non-phosphate builders as a replacement, in whole, or in part, for phosphate builders.

It is a further object of this invention to provide novel water soluble and/or water dispersible hydrophobically modified polycarboxylate polymers which are useful as detergent builders.

SUMMARY OF THE INVENTION

This invention provides water soluble and water dispersible hydrophobically modified polycarboxylate polymers which comprise repeating units of the following structures:

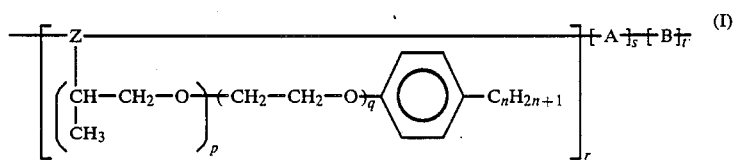

where Z is

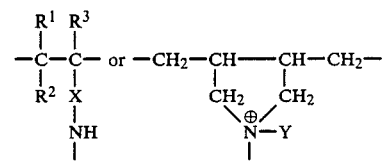

wherein X is

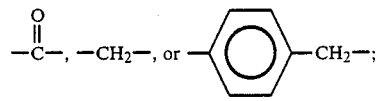

$R^1$ and $R^3$ are H or $C_{1-6}$ alkyl groups; $R^2$ is H, $C_{1-6}$ alkyl group or $-CO_2M$ where M is H or metal cation; Y is H or $C_{1-3}$ alkyl group; p is 1 to 4; q is 1 to 15; n is 6 to 20; A is a repeating unit of the structure:

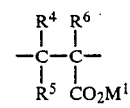

where $R^4$ is H or $C_{1-6}$ alkyl group; $R^5$ is H, $C_{1-6}$ alkyl group or $-CO_2M^2$; $R^6$ is H, $C_{1-6}$ alkyl group or $-CH_2CO_2M^3$ where $M^1$, $M^2$ and $M^3$ are each independently H or a metal cation; B is a repeating unit having the structure:

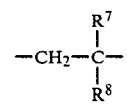

where $R^7$ is H or $C_{1-6}$ alkyl group; $R^8$ is $-CO_2R^9$,

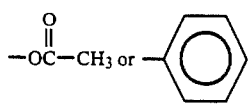

with $R^9$ being a $C_{1-18}$ alkyl group; and r, s and t represent a number of repeating units.

Another embodiment of this invention relates to detergent compositions comprising a surfactant and from about 1 to 25% by weight of the builders (I) as described above.

DETAILED DESCRIPTION OF THE INVENTION

The polymers of this invention are amphiphilic, i.e. comprise one or more hydrophilic and hydrophobic groups and have metallic ion sequestering properties which makes them especially useful as builders in detergent compositions, particularly liquid detergents. These polymers can be prepared by first reacting a selected polyether amine with a compound such as acryloyl chloride, allyl chloride and vinyl benzyl chloride to obtain a monomer having the following general structure:

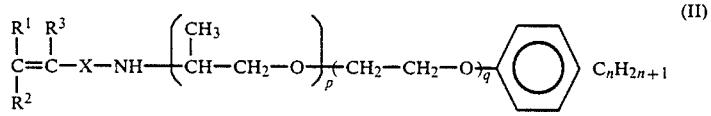

where X is

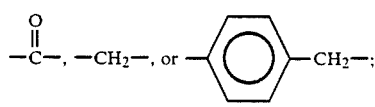

$R^1$ and $R^3$ are H or $C_{1-6}$ alkyl groups; $R^2$ is H, $C_{1-6}$ alkyl group or $-CO_2M$ where M is H or metal cation; p is 1 to 4; q is 1 to 15 and n is 6 to 20. The metal cation M, noted above, may typically be a metal of Group I or II with the alkali metals of Group I being preferred, particularly Na, K and Li. Preferably in the monomer structure II, X is

$R^1$, $R^2$ and $R^3$ are H or $CH_3$ and more preferably H; p is 2 or an average of 2, q is 1 to 12 and n is 8 to 12.

Preparation of monomer II can typically be illustrated by the following reaction of a selected mono(-nonylphenol) polyether amine with acryloyl chloride under Schotten-Baumann conditions:

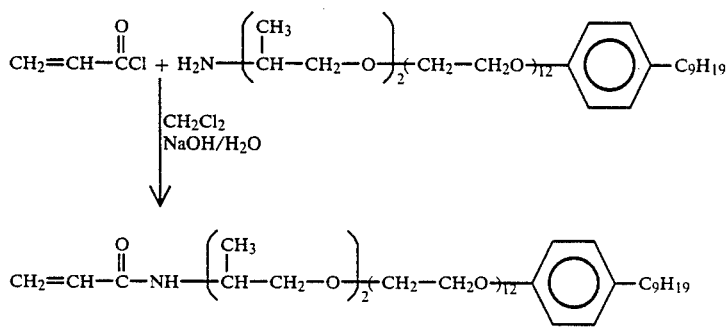

Other forms of the monomer II can be prepared by reaction of selected polyether amines with compounds such as maleic anhydride, allyl chloride, methylallyl chloride, methylacryloyl chloride and vinyl benzyl chloride.

Another form of a polymerizable polyether amine can be obtained from the reaction of one mole equivalent of a selected polyether amine with two mole equivalents of allyl chloride which gives the diallyl polyether amine as illustrated below:

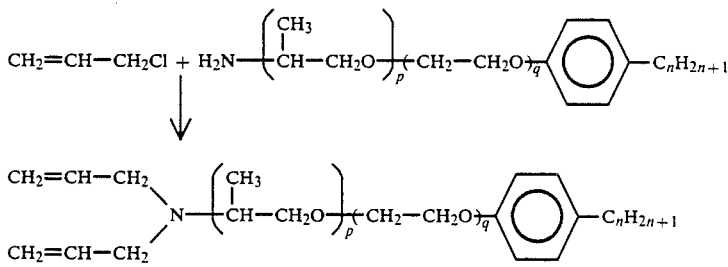

These diallyl polyether amine monomers may then be protonated with mineral acids or quaternized with any of several well known alkylating agents to give a diallyl polyether ammonium monomer of the following structure:

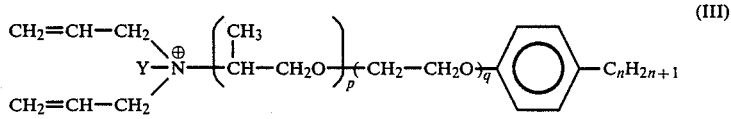

$$\begin{array}{c} CH_2=CH-CH_2 \\ \phantom{CH_2=CH-}\diagdown \\ \phantom{CH_2=CH-CH_2}Y-\overset{\oplus}{N}- \\ \phantom{CH_2=CH-}\diagup \\ CH_2=CH-CH_2 \end{array} \left( \begin{array}{c} CH_3 \\ | \\ CH-CH_2O \\ \end{array} \right)_p (CH_2-CH_2O)_q \phantom{X} -C_nH_{2n+1} \qquad (III)$$

where Y is H or a $C_{1-3}$ alkyl group derived from the alkylating agent. Cyclopolymerization of the monomer III with selected comonomers of this invention as described herein, will result in formation of the polymers containing the repeating units shown in structure I. It is to be noted that the cyclopolymerization of monomer III may in addition to providing the predominant five ring structure for Z in polymer I as shown on page 3, also provide some six ring structures. It is intended that the defined polymer structure I as used in this application, include both five and six ring cyclopolymerized structures as part of the Z group.

The polymers I of this invention are prepared by copolymerizing monomers II or III described above with suitable monomers which will form repeating units A and optional repeating units B. Monomer unit A contains one or more carboxylate groups and is represented by the structure:

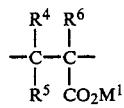

$$\begin{array}{c} R^4 \phantom{-} R^6 \\ | \phantom{-} | \\ -C-C- \\ | \phantom{-} | \\ R^5 \phantom{-} CO_2M^1 \end{array}$$

where $R^4$ is H or $C_{1-6}$ alkyl group; $R^5$ is H, $C_{1-6}$ alkyl group or $-CO_2M^2$ where $M^1$ and $M^3$ are H or a metal cation; $R^6$ is H, $C_{1-6}$ alkyl group or $-CH_2CO_2M^3$ where $M^3$ is H or a metal cation. The metal cations $M^1$, $M^2$, and $M^3$ are as noted for M above, i.e., metals of Group I and II with the alkali metals of Group I being preferred, particularly Na, K and Li. Preferably $R^4$, $R^5$ and $R^6$ are H or $CH_3$ and more preferably H. Repeating units of this structure can be readily obtained from ethylenically unsaturated acids and anhydrides. Illustrative monomer compounds of this type include acrylic acid, methacrylic acid, maleic anhydride, crotonic acid, itaconic acid and similar ethylenically unsaturated monomers.

Optional comonomer units B are represented by the structure:

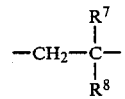

$$\begin{array}{c} R^7 \\ | \\ -CH_2-C- \\ | \\ R^8 \end{array}$$

where $R^7$ is H or $C_{1-6}$ alkyl group; $R^8$ is $-CO_2R^9$,

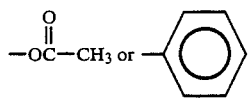

$$-O\overset{O}{\underset{\|}{C}}-CH_3 \text{ or } \phantom{X}$$

with $R^9$ being a $C_{1-18}$ alkyl group. Preferably $R^7$ is H or $CH_3$ and $R^8$ is $-CO_2R^9$ where $R^9$ is $C_{12-18}$ alkyl. Typical copolymerizable monomers which can be used to get this repeating unit are styrene, methyl methacrylate, lauryl methacrylate and vinyl acetate.

The polymerization of the monomers described above to form the polymers I may involve any method known in the art. One method that can be used involves solution polymerization in an organic solvent such as toluene followed by liquid-liquid extraction and neutralization. The amount of monomer units in the polymer I, represented by the respective repeating units r, s and t may be varied to the extent that the polymer remains water dispersible and/or water soluble. Therefore, the hydrophobic monomer derived from a polyether amine and having the structure II/III, will comprise from about 1 to 50 wt. % of the polymer, copolymer unit A will comprise from about 40 to 99 wt. % of the polymer and copolymer unit B will comprise from about 0 to 40 wt. % of the polymer. Preferably, the monomer of structure II/III will comprise from about 2 to 40 wt. % of the polymer, copolymer unit A will comprise from about 50 to 90 wt. % of the polymer and copolymer unit B will comprise from about 0 to 25 wt. % of the polymer. In other words r, s and t as found in polymer structure I, represent repeating units to the extent that the respective monomer proportions are present in the amounts designated above.

It is further noted that each of the monomer units may comprise one or more of the individual components designated for that unit, i.e. mixtures of each of A, B or the hydrophobic component represented by monomer structure II or III may constitute part of the polymer I. Additionally, the polyether parts of the polymer, i.e. the polyethylene oxide and polypropylene oxide may be present in any order and in block or random manner, as long as the total amount of each unit as represented by p and q is maintained.

The water soluble and/or water dispersible polymers I of this invention have been found to be especially useful as builders in detergent compositions. Generally, a detergent composition or formulation comprises a surfactant (surface active agent) or a blend of surfactants, a builder or blend of builders as well as optional components such as soil suspending agents, dyes, fragrances and fabric softeners. The chemical nature of the surfactants or detergent compounds as well as the various optional components used in detergent compositions are well known to those skilled in the art. Typical disclosures of these materials may be found in "Synthetic Detergents", seventh edition by Davidsohn and Milwidsky 1987 and "Surface Active Agents and Detergents" by Schwartz, Perry and Berch.

The detergent composition of the invention generally will comprise a surfactant, an effective amount of the hydrophobically modified polycarboxylate polymer I builder and optional additive and modifier components. More particularly, the detergent composition of this invention will comprise from about 0.5 to 95% by weight of surfactant and from about 1 to 25% by weight of the hydrophobically modified polycarboxylate polymer I builder. Preferably, from about 2 to 20% by weight of the builder will be employed. In addition to the surfactant and builder, the balance of the detergent composition may include, but is not limited to, optional components such as ion exchangers, alkalies, anticorrosion materials, anti-redeposition materials, optical brighteners, fragrances, dyes, fillers, chelating agents, enzymes, fabric whiteners and brighteners, sudsing control agents, solvents, hydrotopes, bleaching agents, bleach precursors, buffering agents, soil removal agents, soil release agents, fabric softening agents and opacifiers.

The following examples are further illustrative of the invention and are not intended to be construed as limitations thereof. In the examples, all parts and percentages are given by weight and all temperatures in degrees Celsius unless otherwise noted.

EXAMPLE I

A hydrophobic monomer having the structure II was prepared by the reaction of a monononylphenol polyether amine with acryloyl chloride under Schotten-Baumann conditions. An initial charge was added to a 1 liter, four-neck flask equipped with glass/teflon mixer assembly, thermometer, condenser, ice water bath and 50 ml. addition funnel.

The initial charge was made up of 119.0 g of Surfonamine MNPA 380 (polyether amine having p of about 2, q of 2 and n of 9), 250 ml of $CH_2Cl_2$ and 24.9 g of a 50% aqueous solution of NaOH. Surfonamine is a registered trademark of Texaco, Inc. This charge was added to the flask, mixed and cooled with ice bath to $-10°$ C. and then 27.5 g of acryloyl chloride added over 45 minutes. The mixture was held at room temperature for 1 hour and the product poured into a 1 liter Erlenmeyer flask with reaction flask rinsed with $CH_2Cl_2$ and added to the Erlenmeyer flask. The $CH_2Cl_2$ solution was dried over $MgSO_4$, filtered and the solvent evaporated. The $CH_2Cl_2$ was then evaporated in vacuo. The monomer product was identified as C.

Another monomer product D was made using similar conditions except that 250.0 g of Surfonamine MNPA 860 (polyether amine having p of about 2, q of 10 and n of 9) and 27.6 g of acryloyl chloride were used.

EXAMPLE II

Polymer builders of the structure I were prepared from the monomer C and D products in Example I using the following modified precipitation polymerization procedure. Into a 1 liter flask equipped with Teflon stirrer, condenser, 50 and 250 ml addition funnels, thermometer and hot oil bath, an initial charge of 49.05 g of maleic anhydride dissolved in 250 ml. of toluene was added and then heated to reflux. Over a three hour period, a mixture of 71.5 g of acrylic acid, 3.3 g of monomer product C (Example I) and 65.0 g of toluene (SA-1) was slowly added. Beginning at the same time, a solution of 2.4 g of benzoyl peroxide and 35.0 g of toluene (SA-2) was added over a 5 hour period. After holding at reflux for 1 hour, the mixture was cooled, filtered and rotary evaporated to remove all toluene. The product was then neutralized with a solution of 6.25N NaOH (320 ml in 400 ml $H_2O$) and then rotary evaporated to give a clear solution identified as Product F.

Using a similar procedure except that SA-1 comprised a mixture of 69.9 g acrylic acid, 13.4 g of monomer product C (Example I) and 65.0 g. of toluene, a polymer product identified as G was prepared.

Another polymer product H was prepared in a similar manner except that SA-1 comprised a mixture of 66.7 g of acrylic acid, 33.4 g of monomer product C (Example I) and 65.0 g of toluene.

Using the monomer D (Example I) and a similar procedure as described above, polymer product J was prepared using the same initial charge with an SA-1 which comprised 71.5 g of acrylic acid, 6.6 g of monomer product D and 65.0 g of toluene. Polymer product K was prepared the same way with an SA-1 which included 69.9 g acrylic acid, 26.25 g of monomer product D and 65.0 g of toluene. In a like manner, polymer product L was prepared with an SA-1 mixture of 66.6 g of acrylic acid, 65.6 g of monomer product D and 65.0 g of toluene.

The prepared polymer products were evaluated analytically and found to have the properties shown in Table 1.

TABLE 1

| Polymer Properties | | | | | | |
|---|---|---|---|---|---|---|
| | Product | | | | | |
| | F | G | H | J | K | L |
| Solids (%) | 18.6 | 17.3 | 7.6 | 22.9 | 17.8 | 10.9 |
| pH | 6.86 | 6.42 | 6.95 | 6.62 | 6.72 | 7.19 |
| Brookfield Viscosity (cps) | 25 | 282 | 37 | 180 | 1190 | 730 |
| Intrinsic Viscosity (1% in (IN KCl) | 0.182 | 0.670 | 0.154 | 0.236 | 0.342 | 0.167 |
| % N (dry) | 0.08 | 0.20 | 0.57 | 0.075 | 0.38 | 0.35 |

EXAMPLE III

This example illustrates the preparation of additional polymers of structure I. They were prepared using a monomer similar to monomer Products C and D produced in Example I except that 238.3 g of Surfonamine MNPA 750 (polyether amine having p of about 2, q of 9.5 and n of 9) and 27.15 g of acryloyl chloride were used. This monomer product was identified as E.

Polymer U included the following constituents, 16.0 g of monomer E, 22.5 g of acrylic acid, 30.7 g of maleic anhydride, 25.4 g of vinyl acetate and 5.4 g of crotonic acid.

Polymer V included 16.1 g of monomer E, 68.4 g of methacrylic acid and 15.5 g of styrene.

Polymer W was comprised of 15.0 g of monomer E, 70.4 g of methacrylic acid, 5.9 g of methyl methacrylate and 8.7 g of itaconic acid.

These polymer products were evaluated and found to have the properties shown below in Table 2.

TABLE 2

| Polymer Properties | | | |
|---|---|---|---|
| | Product | | |
| | U | V | W |
| Solids (%) | 8.7 | 9.0 | 9.0 |
| pH | 7.1 | 7.1 | 7.2 |
| Brookfield Viscosity (cps) | 31 | 1440 | 310 |
| Intrinsic Viscosity (1% in IN KCl) | 0.207 | 0.933 | 0.438 |

EXAMPLE IV

This example illustrates the effectiveness of these polymers in calcium sequestration.

Four solutions of calcium chloride in water containing respectively, 60, 120, 180 and 240 ppm $Ca^{++}$ ion, were each treated with 0.1, 0.2, 0.3 and 0.4 g/l of the experimental builders and a commercially used builder as a control.

The copolymer detergent builders tested were Product F through L identified in Example II and a commercial builder Sokalan ® CP-7 (a trademark registered to BASF Corporation and used in connection with a 2:1 copolymer of acrylic acid and maleic acid).

The results expressed as p(Ca++) are set forth in Table 3. In general the calcium sequestration data show that calcium binding ability decreases with increasing amounts of hydrophobic monomer incorporated into the polymer. However, the polymers compare favorably with the commercially used Sokalan CP-7 builder, showing only a slightly lower sequestration effect.

TABLE 3

Calcium Sequestration at 60 ppm, 120 ppm, 180 ppm and 240 ppm Ca++

| Builder | ppm CA++ | Treatment Level (g/l) | | | |
|---|---|---|---|---|---|
| | | 0.1 | 0.2 | 0.3 | 0.4 |
| Product F | 60 | 3.70 | 4.37 | 5.07 | 5.55 |
| | 120 | 3.20 | 3.45 | 3.79 | 4.24 |
| | 180 | 2.96 | 3.11 | 3.29 | 3.52 |
| | 240 | 2.80 | 2.91 | 3.04 | 3.17 |
| Product G | 60 | 3.67 | 4.14 | 4.76 | 5.24 |
| | 120 | 3.18 | 3.36 | 3.63 | 3.98 |
| | 180 | 2.94 | 3.04 | 3.20 | 3.38 |
| | 240 | 2.78 | 2.86 | 2.96 | 3.09 |
| Product H | 60 | 3.61 | 3.96 | 4.48 | 4.89 |
| | 120 | 3.15 | 3.30 | 3.46 | 3.73 |
| | 180 | 2.92 | 3.01 | 3.12 | 3.26 |
| | 240 | 2.76 | 2.84 | 2.91 | 3.00 |
| Product J | 60 | 3.69 | 4.45 | 5.19 | 5.59 |
| | 120 | 3.16 | 3.46 | 3.87 | 4.37 |
| | 180 | 2.92 | 3.08 | 3.30 | 3.60 |
| | 240 | 2.75 | 2.88 | 3.02 | 3.20 |
| Product K | 60 | 3.69 | 4.24 | 4.98 | 5.37 |
| | 120 | 3.19 | 3.43 | 3.77 | 4.09 |
| | 180 | 2.96 | 3.11 | 3.28 | 3.46 |
| | 240 | 2.82 | 2.91 | 3.03 | 3.15 |
| Product L | 60 | 3.52 | 3.75 | 4.09 | 4.49 |
| | 120 | 3.11 | 3.21 | 3.35 | 3.51 |
| | 180 | 2.89 | 2.97 | 3.04 | 3.14 |
| | 240 | 2.74 | 2.80 | 2.86 | 2.92 |
| Sokalan ® | 60 | 3.85 | 4.84 | 5.73 | 6.24 |
| | 120 | 3.26 | 3.57 | 4.11 | 4.80 |
| | 180 | 3.00 | 3.17 | 3.39 | 3.76 |
| | 240 | 2.83 | 2.95 | 3.08 | 3.27 |

EXAMPLE V

Polymer products J and L, identified in Example II, were tested for surfactant phase boundary along with commercial builder Sokalan® CP-7, a non-hydrophobically modified copolymer of 2:1 acrylic acid/maleic acid. The surfactant phase boundary is the various polymer/surfactant concentrations above which a two-phase mixture exists and below which a homogeneous solution exists. At varying levels of 10 to 30% by weight of Neodol 25-9 (registered trademark of Shell Chemical Co.), a non-ionic surfactant and 5 to 15% by weight of the polymer products in water, solutions were evaluated after being aged overnight at room temperature. The results are shown in Table 4 and by comparison it is noted how the hydrophobically modified polymers of the invention (J and L) are compatible (C) at higher levels and with higher concentrations of the surfactant. These results indicate that the hydrophobically modified polymers can be formulated with surfactants in both higher amounts of polymer and greater concentrations of surfactants.

TABLE 4

Surfactant Phase Boundary
(C-represents compatible/homogenous system,
P-represents two-phase system)

| Surfactant Concentration (wt %) | Product | | |
|---|---|---|---|
| | J | L | CP-7 |
| 5% wt Polymer Concentration | | | |
| 10 | C | C | C |
| 20 | C | C | P₁ |
| 30 | P₂ / C | P | P |
| 1 is using 1.8% polymer | | | |
| 2 is using 3.5% polymer | | | |
| 10% wt Polymer Concentration | | | |
| 10 | C | C | P |
| 20 | P₃ / C | C | P |
| 30 | — | P | — |
| 3 is using 7.5% polymer | | | |
| 15% wt Polymer Concentration | | | |
| 10 | P₄ / C | C | P |
| 20 | P | C | — |
| 30 | — | — | — |
| 4 is using 12.5% polymer | | | |

What is claimed is:

1. A hydrophobically modified polycarboxylate polymer which comprises repeating units of the structure:

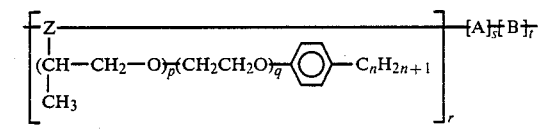

where Z is

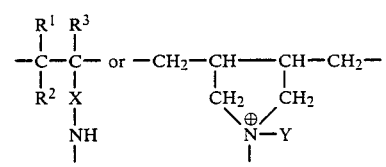

wherein X is

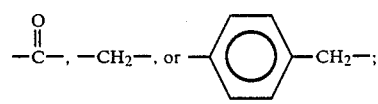

$R^1$ and $R^3$ are H or $C_{1-6}$ alkyl groups; $R^2$ is H, $C_{1-6}$ alkyl group or $-CO_2M$ where M is H or metal cation; Y is H or $C_{1-3}$ alkyl group; p is 1 to 4; q is 1 to 15; n is 6 to 20; A is a repeating unit of the structure:

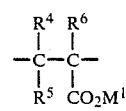

where $R^4$ is H or $C_{1-6}$ alkyl group; $R^5$ is H, $C_{1-6}$ alkyl group or $-CO_2M^2$, $R^6$ is H, $C_{1-6}$ alkyl group or $-CH_2CO_2M^3$ where each of $M^1$, $M^2$ and $M^3$ are H or a metal cation; B is a repeating unit having the structure:

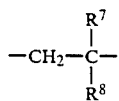

where $R^7$ is H or $C_{1-6}$ alkyl group; $R^8$ is $CO_2R^9$,

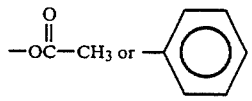

with $R^9$ being a $C_{1-6}$ alkyl group; and r, s and t represent repeating units such that the [hydrophobic monomer]$_r$ unit comprises from about 1 to 50% by weight of the polymer, copolymer unit [A]$_s$ comprises from about 40 to 95% by weight of the polymer, and copolymer unit [B]$_t$ comprises from about 0 to 40% by weight of polymer.

2. The polymer of claim 1 wherein X is

$R^1$, $R^2$ and $R^3$ are H or $CH_3$; p is an average of 2; q is 1 to 12 and n is 8 to 12.

3. The polymer of claim 2, wherein in the A unit, $M^1$ is H or a metal selected from the group consisting of Na, K and Li; $R^5$ is $-CO_2M^2$ where $M^2$ is H or a metal selected from the group consisting of Na, K and Li; and $R^4$ and $R^6$ are H.

4. The polymer of claim 3, wherein in the B unit, $R^7$ is H and $R^8$ is

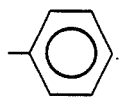

5. The polymer of claim 4 wherein Z is

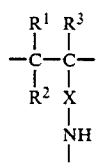

6. The polymer of claim 1 wherein the [hydrophobic monomer]$_r$ unit comprises from about 2 to 40% by weight of the polymer, copolymer unit [A]$_s$ comprises from about 50 to 90% by weight of the polymer and copolymer unit [B]$_t$ comprises from about 0 to 25% by weight of the polymer.

7. The polymer of claim 6 wherein X is

$-R^1$, $R^2$ and $R^3$ are H or $CH_3$; p is an average of 2; q is 1 to 12 and n is 8 to 12.

8. The polymer of claim 7 wherein in the A unit, $M^1$ is H or a metal cation selected from the group consisting of Na, K and Li; $R^5$ is $-CO_2M^2$ where $M^2$ is H or a metal selected from the group consisting of Na, K and Li; and $R^4$ and $R^6$ are H.

9. The polymer of claim 8 wherein the B unit, $R^7$ is H and $R^8$ is

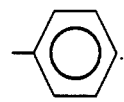

10. The polymer of claim 9 wherein Z is

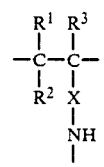

11. A detergent composition comprising a detergent effective amount of a surfactant and an effective amount of the polymer of claim 1 as a builder.

12. The detergent composition of claim 11 wherein the surfactant comprises from about 0.5 to 95% by weight and the polymer builder comprises from about 1 to 25% by weight of the detergent composition.

13. The composition of claim 12 wherein X is

$R^1$, $R^2$ and $R^3$ are H or $CH_3$; p is an average of 2; q is 1 to 12 and n is 8 to 12.

14. The composition of claim 13 wherein in the A unit, $M^1$ is H or a metal cation selected from the group consisting of Na, K and Li; $R^5$ is $-CO_2M^2$ where $M^2$ is H or a metal cation selected from the group consisting of Na, K and Li; and $R^4$ and $R^6$ are H.

15. The composition of claim 12 wherein in the B unit, $R^7$ is H and $R^8$ is

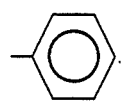

16. The composition of claim 15 wherein Z is

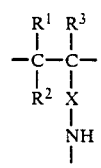

17. The composition of claim 12 wherein from about 2 to 20% of the polymer builder is used.

18. The composition of claim 17 wherein X is

and $R^1$, $R^2$ and $R^3$ are H or $CH_3$.
19. The composition of claim 18 wherein p is an average of 2; q is 1 to 12 and n is 8 to 12.
20. The composition of claim 19 wherein in the A unit $M^1$ is H or a metal cation selected from the group consisting of Na, K and Li; and $R^4$ and $R^6$ are H.
21. The composition of claim 20 wherein in the B unit, $R^7$ is H and $R^8$ is
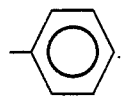
22. The composition of claim 21 wherein Z is
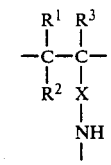
* * * * *